United States Patent
Sage

[19]

[11] Patent Number: 5,884,676
[45] Date of Patent: Mar. 23, 1999

[54] OIL FILTER DRAINAGE BOX AND RECOVERY SYSTEM

[76] Inventor: Gary Sage, HCR 5 Box 524, Dalhart, Tex. 79022

[21] Appl. No.: 62,467

[22] Filed: Apr. 20, 1998

[51] Int. Cl.⁶ ........................................................ B65B 3/04
[52] U.S. Cl. .............................. 141/106; 141/98; 141/86; 141/332; 141/333
[58] Field of Search .............................. 141/98, 106, 231, 141/331–333, 340–342, 383

[56] References Cited

U.S. PATENT DOCUMENTS

| | | | |
|---|---|---|---|
| 92,791 | 7/1869 | Burwell | 141/106 |
| 205,665 | 8/1878 | Miller et al. | 141/106 |
| 447,643 | 3/1891 | Kersey | 141/106 |
| 478,303 | 7/1892 | Allgood | 141/106 |
| 483,757 | 10/1892 | Allgood | 141/86 |
| 578,671 | 3/1897 | Wisdom | 141/106 |
| 3,867,999 | 2/1975 | Cox | 184/1.5 |
| 4,420,023 | 12/1983 | Cislak | 141/198 |
| 4,665,958 | 5/1987 | Holloway et al. | 141/106 |
| 4,832,095 | 5/1989 | Bonnell | 141/106 |
| 5,154,775 | 10/1992 | Bedi | 134/22.1 |
| 5,168,959 | 12/1992 | Davis | 184/1.5 |
| 5,172,739 | 12/1992 | Ristroph | 141/98 |
| 5,190,085 | 3/1993 | Dietzen | 141/98 |
| 5,291,921 | 3/1994 | Devine | 141/106 |
| 5,299,714 | 4/1994 | Kilgore | 222/81 |
| 5,406,691 | 4/1995 | Thorne | 29/564.3 |
| 5,476,154 | 12/1995 | Sage | 184/1.5 |
| 5,477,897 | 12/1995 | Scofield | 141/105 |
| 5,489,042 | 2/1996 | Ewald | 220/573 |
| 5,505,295 | 4/1996 | Whittington | 206/223 |
| 5,524,356 | 6/1996 | Lutz | 34/164 |
| 5,562,181 | 10/1996 | Elkin et al. | 184/1.5 |
| 5,577,539 | 11/1996 | Shaw et al. | 141/332 |
| 5,611,377 | 3/1997 | Maguire | 141/98 |
| 5,647,414 | 7/1997 | Brittaiin et al. | 141/231 |
| 5,653,271 | 8/1997 | Brittain et al. | 141/98 |

FOREIGN PATENT DOCUMENTS

| | | |
|---|---|---|
| 643749 | 6/1962 | Canada . |
| 1416096 | 12/1975 | United Kingdom . |
| 1432610 | 4/1976 | United Kingdom . |
| WO 89/09362 | 10/1989 | WIPO . |

*Primary Examiner*—J. Casimer Jacyna
*Attorney, Agent, or Firm*—Richard C. Litman

[57] ABSTRACT

An oil filter drainage box having a plurality of support members for holding spent oil filters. The drainage box comprises a container having four side walls, a lid and a base member. The spent oil filters are placed on the support member and the residual oil in the filters drains out due to gravitational forces. The base member is inclined slightly to allow the oil to collect in a reservoir which is situated within the base member. There is a plurality of support posts extending upwardly perpendicular to the base member for engaging the spent oil filters. The lid provides a watertight seal which prevents the oil from leaving the box and damaging the environment. The reservoir is provided with a valve assembly. The valve assembly has a coupling which is attached to the reservoir, a valve, and a hose. The hose is attached to an oil vacuuming unit, which is preferably mobile and carries a complement of storage tanks and air compressor/vacuuming units. When the valve is opened, the oil is vacuumed out of the reservoir with little possibility of oil contaminating the ground.

7 Claims, 2 Drawing Sheets

OIL FILTER DRAINAGE BOX AND RECOVERY SYSTEM

BACKGROUND OF THE INVENTION

1. Field of the Invention

The present invention relates to an apparatus for collecting spent oil filters and the oil contained therein. More specifically, the invention is a box having a self sealing lid, drainage posts and a reservoir for storing waste oil for use with a oil tank and vacuuming system.

2. Description of the Related Art

When an oil change is performed, people go to great lengths to ensure that not a single drop of oil reaches the ground. However, what most people fail to realize is that a significant amount of oil remains in the oil filter. Often these filters are discarded as ordinary trash, and the waste oil contained therein eventually finds its way to land fills and ultimately into the ground.

Several patents have addressed the issue of changing motor oil and retrieving waste oil from the oil filters. Patents that disclose apparatus for changing lube oil are U.S. Pat. No. 3,867,999 (Method and Apparatus for Changing Lube Oil) issued on Feb. 25, 1975 to Cox; U.S. Pat. No. 5,154,775 (Integrated Method for Cleaning and Flushing an Internal Combustion Engine) issued on Oct. 13, 1992 to Bedi; U.S. Pat. No. 5,476,154 (Powered Oil Change Apparatus) issued on Dec. 19, 1995 to Sage; U.S. Pat. No. 5,562,181 (Apparatus and Method for Automatically Performing Engine Fluid Changes) issued on Oct. 8, 1996 to Elkin et al.; and Canadian Patent No. 643,749 (Internal Combustion Engines) issued on Jun. 26, 1962.

U.S. Pat. No. 5,168,959 issued on Dec. 8, 1992 to Davis discloses a container with a lid which has apertures therethrough which are adapted for receiving the nozzles of fluid bottles such as oil containers. The Davis patent does not disclose housing spent oil filters within a drainage container to prevent the containers from easily tipping. Further, Davis does not teach a method for removing fluid from the container using a vacuuming means.

U.S. Pat. No. 5,299,714 issued on Apr. 5, 1994 to Kilgore discloses a tool for removing oil from a spent oil filter. The tool has a sharp end which pierces the outer casing of the oil filter and the oil drains through a tube in the shaft of the tool. Kilgore does not teach the use of draining posts for draining oil filters into a reservoir which is ultimately vacuumed out as in the present invention.

U.S. Pat. No. 5,477,897 issued on Dec. 26, 1995 to Scofield discloses a recovery system for new oil including a container with ports therein for receiving the nozzle end of one quart oil containers. The oil drains into a larger container which can be used for various purposes. The patent to Scofield does not teach the use of an enclosed container for housing spent oil filters in order to provide a watertight stable environment to prevent the oil from damaging the environment.

U.S. Pat. No. 5,489,042 issued on Feb. 6, 1996 to Ewald discloses a container for storing waste oil and a stand for holding an oil filter within the container such that its contents may drain over time. There is a lid provided with a recess therein adapted for receiving the oil filter such that the lid can be securely fastened while the oil filter is in the container. Ewald does not teach a means for capturing the waste oil such that it can be readily drained out by a vacuum or similar means.

U.S. Pat. No. 5,505,295 issued on Apr. 9, 1996 to Whittington discloses a container capable of holding motor oil. The top surface of the container has pegs for holding oil bottles and filters and apertures through which waste oil can drain into the container. Whittington does not disclose a container which houses the spent oil filters or oil bottles such that they are stable and not subject to contact with the environment. Further, Whittington does not teach the use of a vacuuming or similar means to drain the waste oil from the container.

U.S. Pat. No. 5,524,356 issued on Jun. 11, 1996 to Lutz discloses an apparatus for low cost extraction of oil residue from oil filters. The filters are strapped to a mounting apparatus which is oscillated by a mechanical means whereby the oil which is not drained by gravitational forces is shaken free. The oil is collected in a separate pan located beneath the apparatus. Lutz does not teach the use of an integrally connected reservoir to collect waste oil which is then removed from the reservoir by vacuuming or similar means.

U.S. Pat. No. 5,611,377 issued on Mar. 18, 1997 to Maguire discloses a device for facilitating the draining of residual oil or fuel remaining in an oil or fuel filter. The filters are placed on a screen through which the oil can drain. There is no means for supporting the filters such that they are prevented from tipping over inadvertently.

U.S. Pat. No. 5,647,414 issued on Jul. 15, 1997 and U.S. Pat. No. 5,653,271 issued on Aug. 5, 1997 to Brittain et al. discloses an oil filter recycle apparatus comprising a bucket having a support therein for holding the oil filters. There is no means for supporting the oil filters as in the present invention. Further, there is a drain assembly that can be inserted into the bucket to remove the waste oil once the filters have completely drained, but the drain assembly is not always in place as in the present invention.

U.S. Pat. No. 4,420,023 issued on Dec. 13, 1983 to Cislak discloses an apparatus for collecting viscous fluid for future use from a bearing or similar device. The invention in Cislak does not disclose a container which is suitable for draining spent oil filters.

World Patent WO 89/09362 published on Oct. 5, 1989 discloses a fluid collection and drainage pan. The pan does not disclose a vacuuming or similar means for draining the collected fluid as in the present invention.

British Patent No. 1,432,610 published on Apr. 22, 1976 discloses a container adapted for receiving spent motor oil from the crankcase of a car. The oil is then forced out of the container by operating a pump with compressed air. The patent does not teach or describe a constant vacuum connected to the outlet of the container that can be activated by simply opening a valve.

Other patents which are generally related to the present invention are U.S. Pat. No. 5,406,691 (Apparatus for Recycling Oil Canister Filters) issued on Apr. 18, 1995 to Thorne; and British Patent No. 1,416,096 (Container for Waste Engine Oil) published on Dec. 3, 1975.

None of the above inventions and patents, taken either singularly or in combination, is seen to describe the instant invention as claimed. Thus an oil filter drainage box solving the aforementioned problems is desired.

SUMMARY OF THE INVENTION

The present invention is an oil filter drainage box having a plurality of support posts for holding spent oil filters. The drainage box comprises a container having four side walls, a lid and a base member. The spent oil filters are placed on the support posts and the residual oil in the filters drains out due to gravitational forces. The base member is inclined slightly to allow the oil to collect in a reservoir which is situated within the base member. The lid provides a watertight seal which prevents the oil from leaving the box and damaging the environment. The reservoir is provided with a valve assembly. The valve assembly has a coupling which is attached to the reservoir, a valve, and a hose. The hose is attached to a mobile oil vacuuming unit. The preferred oil vacuuming unit is that one described in U.S. Pat. No. 5,476,154 issued to Sage, noted the in above section entitled DESCRIPTION OF THE RELATED ART, and is incorporated by reference herein. The reservoir is positioned on the trailer of the mobile unit at a conveniently accessible location. When the valve is opened, the oil is vacuumed out of the reservoir minimizing the possibility of oil hitting the ground.

Accordingly, it is a principal object of the invention to provide an oil filter drainage box which minimizes the amount of residual oil which can come in contact with the environment.

It is another object of the invention to provide an oil filter drainage box which provides support for draining oil filters such that they do not tip easily while they are drained over an extended period of time.

It is a further object of the invention to provide an oil filter drainage box which provides a reservoir for collecting large quantities of oil therein.

Still another object of the invention is to provide a means of quickly evacuating the reservoir of the oil filter drainage box of the present invention.

Yet another object of the invention to provide a mobile recovery reservoir and system for vacuuming recovered oil from the reservoir.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
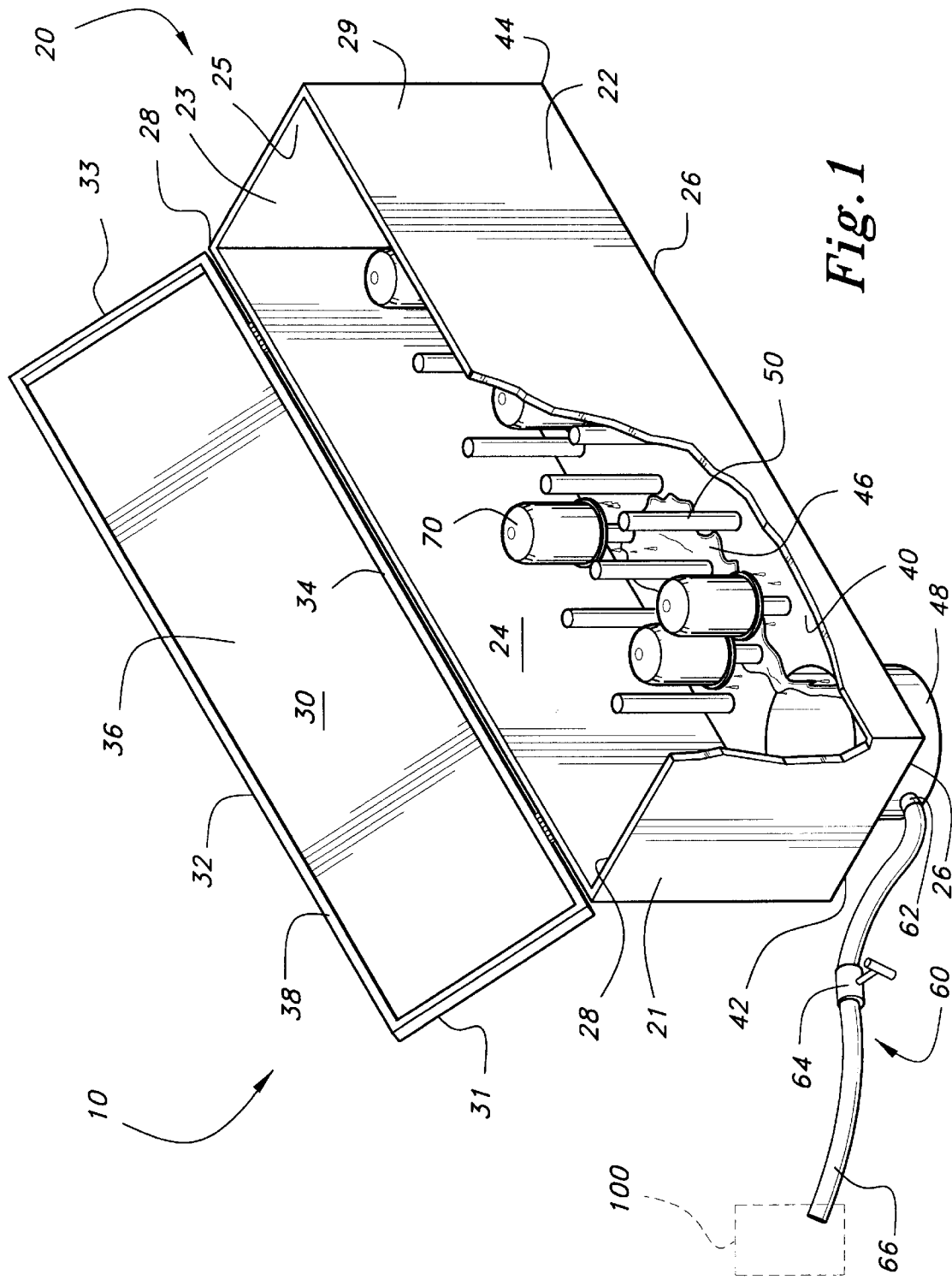
FIG. 1 is an environmental, perspective view of an oil filter drainage box according to the present invention.

The present invention is an oil filter drainage box 10 comprising a container 20 having four side walls 21, 22, 23, 24, a lid 30, a base member 40 provided with a reservoir 48 therein; a plurality of oil filter support posts 50 depending upward from the base member 40; and a reservoir evacuation means 60.

Figure 2:
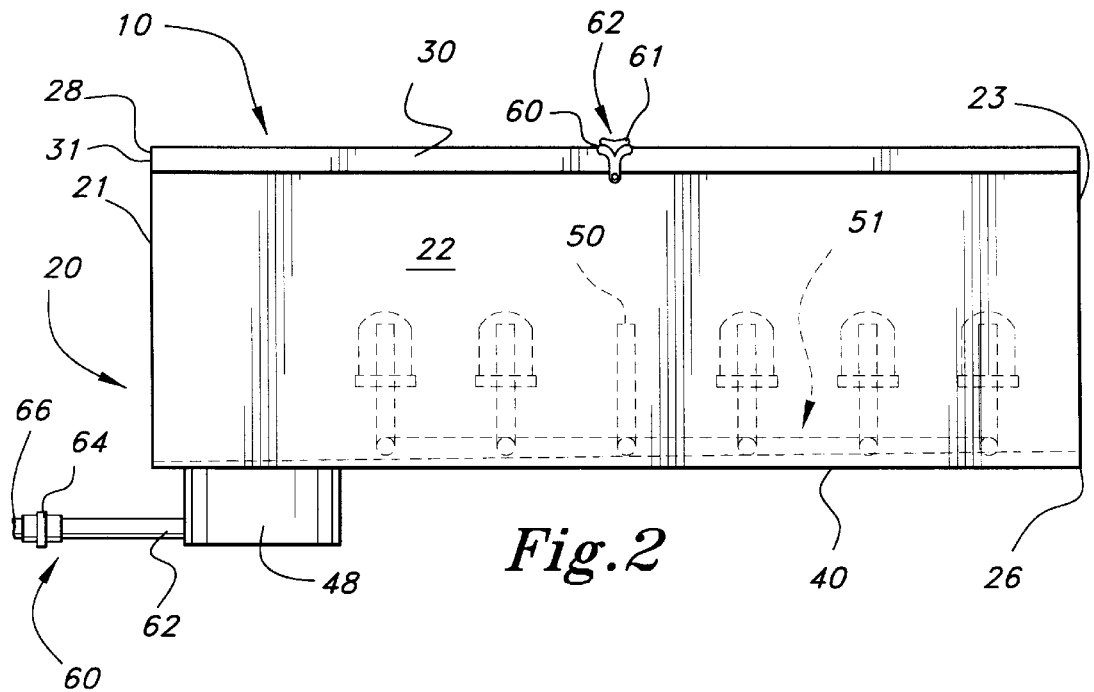
FIG. 2 is a front elevational view of an oil filter drainage box according to the present invention having a second removable drainage grid for receiving a plurality of oil filters.
Figure 3:
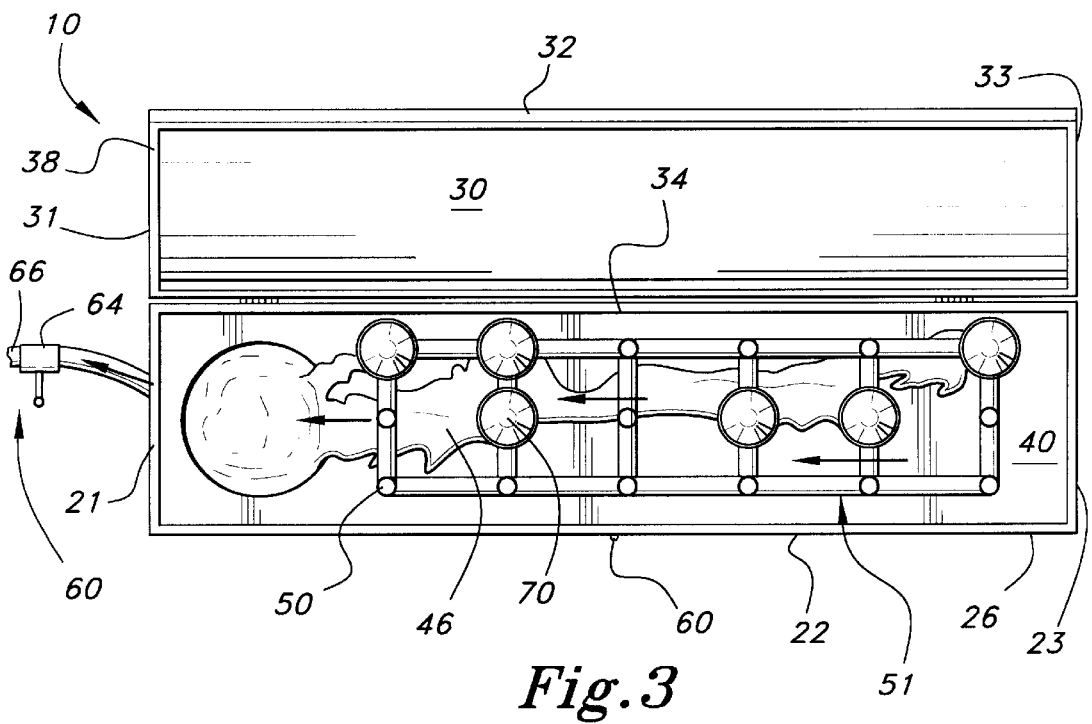
FIG. 3 is an environmental, top plan view of an oil filter drainage box according to the embodiment as shown in FIG. 2.

The container 20 has a first side wall 21, a second side wall 22, a third side wall 23 and a fourth side wall 24, each having a first end 26 and a second end 28 and an inner surface 25 and outer surface 29. The first side wall 21 is opposite the third side wall 23, and the second side wall 22 is opposite the fourth side wall 24. The base member 40, which has a first end 42 and a second end 44, is integrally formed with the side walls 21, 22, 23, 24 such that the first end 42 of the base member 40 is in contact with the first end 26 of the first side wall 21. The second end 44 of the base member 40 is integrally formed with the inner surface 25 of the second 22, third 23 and fourth side wall 24 such that the base member 40 forms a slightly inclined surface towards the reservoir 48. The base member 40 defines a bore near its first end 42 which is integrally connected with a reservoir 48 adapted for receiving large quantities of fluid such as spent motor oil 46. There are a plurality of oil filter support posts 50 depending upward from the base member 30, having a length such that a spent oil filter 70 may be removably placed thereon and suspended over the base member 30. FIG. 1 shows a first embodiment wherein the support posts 50 are integrally attached, whereas FIGS. 2 and 3 show a second embodiment having removable grid 51 of posts 50.

The reservoir 48 is provided with an evacuation means 60 for removing the fluid 46 therefrom. In the preferred embodiment of the invention, the evacuation means includes a coupling 62 which is provided with a valve 64 having opposite ends. The opposite end of the valve 64 from where the coupling 62 is connected, is connected to a drainage hose 66 which is ultimately connected to an oil vacuum system 100 (diagrammatically shown in FIG. 1). The vacuum system 100 as described in U.S. Pat. No. 5,476,154 issued to Sage is preferably used and is incorporated by reference herein. The oil vacuum system readily evacuates the reservoir 60 without any oil 46 coming in contact with the environment. As can be readily understood from viewing U.S. Pat. No. 5,476,154, the oil vacuum system 100 is a mobile unit having a trailer (16, FIG. 1 of Pat. No. 5,476,154) carrying a plurality of storage tanks and compressor/vacuum units. The presently described filter box 10 may be attached to the trailer 16 for transport with the remaining components, and operably connected to the oil hose (24, FIG. 1 of Pat. No. 5,476,154) having a coupling suitable for connection with drainage hose 66. Thus a recovery system is described employing the present invention.

The lid 30 is a substantially planar member having first 31, second 32, third 33, and fourth 34 edges. The lid 30 further has an inner surface 36 which has three flanges 38 extending inwardly perpendicular therefrom along the first 31, second 32 and third 33 edges of the lid such that a water tight environment is provided within the container when the lid 30 is in the closed position. The lid is hingedly connected to the second end 28 of the fourth side wall 24 of the container 20 along the fourth edge 34 of the lid 30. A latch 62 is provided to maintain the lid in a closed position; the latch 62 preferably comprises a cleat 61 provided on the lid 30 and a stretchable loop 60 which, when stretched over the cleat and released, provides a downward tension on the lid 30 to keep it closed.

It is to be understood that the present invention is not limited to the embodiments described above, but encompasses any and all embodiments within the scope of the following claims.

I claim:

1. An oil filter drainage system comprising:
   a container having
      a first side wall, second side wall, a third side wall, and a fourth side wall, each having a first end and a second end and an inner and outer surface, wherein said first side wall is opposite said third side wall, and said second side wall is opposite said fourth side wall;

a base member having a first end and a second end integrally formed with said side walls;

said first end of said base member is integrally formed with said first end of said first side wall, and said second end of said base member is integrally formed with said third side wall at some point above said first end of said third side wall, wherein said base member forms an inclined surface having a lowest end at said first end;

said base member further defining a bore proximate the lowest end;

a lid having an inner surface and first, second, third, and fourth edges coupled with said fourth side wall;

a reservoir integrally connected with said base member in registry with said bore;

an evacuation means coupled with said reservoir; and a plurality of oil filter support posts depending upwardly from said base member.

2. The oil filter drainage system according to claim 1, wherein said evacuation means comprises a coupling provided with a valve and an evacuation hose to which said valve is connected.

3. The oil filter drainage system according to claim 2, wherein said evacuation means is connected to said evacuation hose.

4. The oil filter drainage system according to claim 3, wherein said evacuation means comprises a powered, mobile oil change apparatus for carrying and evacuating said container.

5. The oil filter drainage system according to claim 4, wherein said powered, mobile oil change apparatus comprises an oil storage tank having an interior;

an air compressor having a suction side and a discharge side;

an oil conduit having proximal and distal ends, said distal end including one member of a pair of mating, quick coupling connector members for connecting to said evacuation hose of said container;

a first air conduit communicating between said oil tank interior and said air compressor suction side, there being a first valve selectively enabling and stopping air flow within said first air conduit, and a second air conduit communicating between said air compressor discharge side and said oil tank interior, there being a second valve selectively enabling and stopping air flow within said second air conduit; whereby said powered mobile oil change apparatus is selectively operated in an oil draining mode and in an oil emptying mode by selecting connection thereof to one of said air compressor suction and discharge sides and operating said first and second valves and operating said air compressor.

6. The oil filter drainage system according to claim 1, wherein said lid further comprises a flange extending inwardly perpendicular from said inner surface of said lid along said first, second, and third edge;

said fourth edge of said lid further being hingedly connected with said second edge of said fourth side wall.

7. The oil filter drainage system according to claim 1, wherein said plurality of support members are cylindrical pegs for engaging the center bore of an oil filter.

* * * * *